US011308646B2

(12) United States Patent
Syed

(10) Patent No.: US 11,308,646 B2
(45) Date of Patent: Apr. 19, 2022

(54) EXTRACTING COLOR FROM ITEM IMAGES

(71) Applicant: Walmart Apollo, LLC, Bentonville, AR (US)

(72) Inventor: Haider Syed, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 23 days.

(21) Appl. No.: 15/931,105

(22) Filed: May 13, 2020

(65) Prior Publication Data

US 2021/0358171 A1  Nov. 18, 2021

(51) Int. Cl.
*G06K 9/46* (2006.01)
*G06T 7/194* (2017.01)
(Continued)

(52) U.S. Cl.
CPC .......... *G06T 7/90* (2017.01); *G06K 9/46* (2013.01); *G06K 9/4652* (2013.01);
(Continued)

(58) Field of Classification Search
CPC ....... G06Q 30/0603; G06T 7/194; G06T 7/90; G06T 11/001; G06T 11/60; G06T 2207/10024; G06K 9/46; G06K 9/4652
See application file for complete search history.

(56) References Cited

U.S. PATENT DOCUMENTS 5,018,218 A * 5/1991 Peregrim .................. G06K 9/56
342/62
6,038,340 A * 3/2000 Ancin ....................... G06K 9/38
358/518
(Continued)

FOREIGN PATENT DOCUMENTS

JP   2016177586 A  * 10/2016

OTHER PUBLICATIONS

Kahn et al. ("Automatic Feature Learning for Robust Shadow Detection," IEEE Conference on Computer Vision and Pattern Recognition, Date of Conference: Jun. 23-28, 2014) (Year: 2014).*
Tao et al. ("Image segmentation by three-level thresholding based on maximum fuzzy entropy and genetic algorithm," Pattern Recognition Letters, vol. 24, Issue 16, Dec. 2003) (Year: 2003).*
(Continued)

*Primary Examiner* — Yubin Hung
(74) *Attorney, Agent, or Firm* — Bryan Cave Leighton Paisner LLP

(57) ABSTRACT

A system including one or more processors and one or more non-transitory computer-readable media storing computing instructions configured to run on the one or more processors and perform: obtaining an image of an item; removing background pixels from the image by removing white pixels from the image up to a first threshold; determining an item outline of the item in the image, wherein the item outline comprises aliased pixels along a periphery of the item in the image; removing grey pixels from the item outline in the image up to a second threshold to create a first updated image; removing shadows from the first updated image to create a second updated image based on a saliency map and a third threshold for shadow-like grey pixels; mapping each pixel in the second updated image to a respective mapped color in a predetermined color palette; and determining one or more dominant colors of the respective mapped colors based on one or more highest respective percentages of the respective mapped colors. Other embodiments are disclosed.

20 Claims, 16 Drawing Sheets
(11 of 16 Drawing Sheet(s) Filed in Color)

(51) Int. Cl.
*G06T 7/90* (2017.01)
*G06T 11/60* (2006.01)
*G06Q 30/06* (2012.01)
*G06T 11/00* (2006.01)

(52) U.S. Cl.
CPC ......... *G06Q 30/0603* (2013.01); *G06T 7/194* (2017.01); *G06T 11/001* (2013.01); *G06T 11/60* (2013.01); *G06T 2207/10024* (2013.01)

(56) References Cited

U.S. PATENT DOCUMENTS

| | | | | |
|---|---|---|---|---|
| 6,647,883 | B1* | 11/2003 | McNeil | B41M 1/00 |
| | | | | 101/114 |
| 6,671,419 | B1* | 12/2003 | Martins | G06T 5/002 |
| | | | | 358/463 |
| 7,088,472 | B1* | 8/2006 | Okubo | H04N 1/603 |
| | | | | 358/2.1 |
| 7,652,677 | B2 | 1/2010 | Dorbie et al. | |
| 7,733,546 | B2 | 6/2010 | Yamada | |
| 8,041,108 | B2 | 10/2011 | Takahashi et al. | |
| 8,295,606 | B2 | 10/2012 | Li et al. | |
| 8,391,594 | B1 | 3/2013 | Wang et al. | |
| 9,367,899 | B1* | 6/2016 | Fang | G06T 7/11 |
| 10,083,521 | B1 | 9/2018 | Dhua et al. | |
| 10,290,219 | B2* | 5/2019 | Deng | G06K 9/00785 |
| 10,430,857 | B1 | 10/2019 | Haitani et al. | |
| 10,922,801 | B2* | 2/2021 | Coleman | G06K 9/4652 |
| 2007/0110309 | A1 | 5/2007 | Ibrahim et al. | |
| 2010/0074546 | A1* | 3/2010 | Ishigami | G06K 9/38 |
| | | | | 382/251 |
| 2010/0119153 | A1* | 5/2010 | Rai | H04N 1/4072 |
| | | | | 382/190 |
| 2012/0008020 | A1* | 1/2012 | Zhang | G06K 9/346 |
| | | | | 348/251 |
| 2012/0062932 | A1 | 3/2012 | Rueby | |
| 2015/0310303 | A1* | 10/2015 | Andreopoulos | G06K 9/4652 |
| | | | | 382/158 |
| 2016/0189354 | A1* | 6/2016 | Kikuchi | G06T 7/136 |
| | | | | 382/167 |
| 2016/0232686 | A1* | 8/2016 | Park | G06T 11/001 |
| 2017/0142452 | A1* | 5/2017 | Bae | H04L 67/10 |
| 2019/0213721 | A1* | 7/2019 | Urashita | G06K 9/00771 |
| 2019/0320094 | A1* | 10/2019 | Jackson | G01N 21/251 |

OTHER PUBLICATIONS

Muppidi et al. ("Image segmentation by multi-level thresholding using genetic algorithm with fuzzy entropy cost functions," International Conference on Image Processing Theory, Tools and Applications; Date of Conference: Nov. 10-13, 2015) (Year: 2015).*

\* cited by examiner

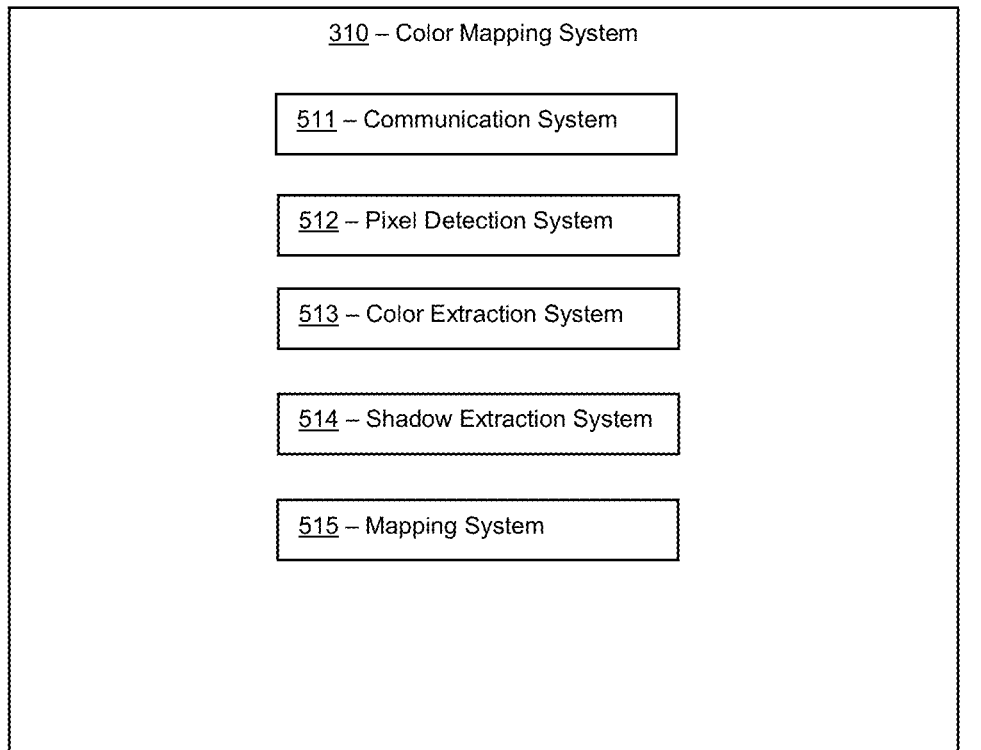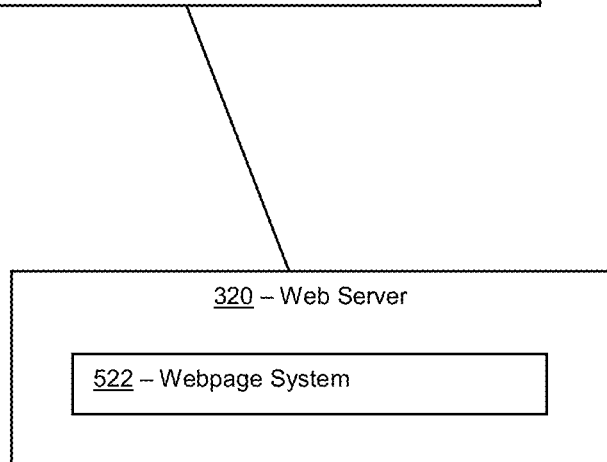
FIG. 5

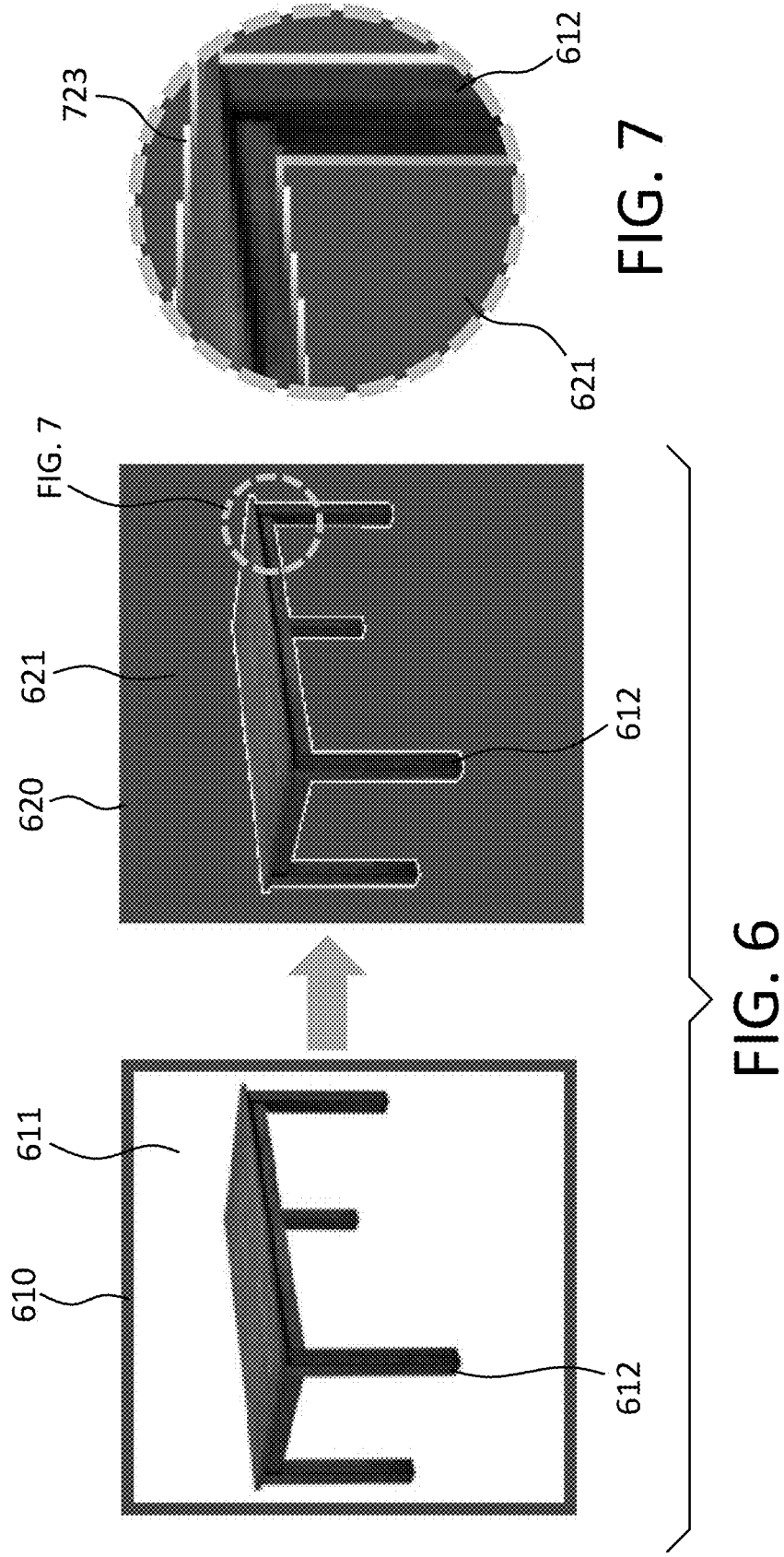

EXTRACTING COLOR FROM ITEM IMAGES

TECHNICAL FIELD

This disclosure relates generally relates to extracting color from item images.

BACKGROUND

Sellers often upload items to be provided by an online retailer. Sometimes, the sellers can specify colors for the items to be included in an item catalog. Such color information is often unstructured and/or unrestricted. Other times, the sellers do not specify colors for the items.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

To facilitate further description of the embodiments, the following drawings are provided in which:

FIG. 5 illustrates a representative block diagram for extracting color from item images, according to the embodiment of FIG. 3;

FIG. 6 illustrates exemplary images showing the removal of white pixels from the white background of an image;

FIG. 7 illustrates an enlarged view of a portion of FIG. 6, showing of aliased edges of an item;

Figure 1:
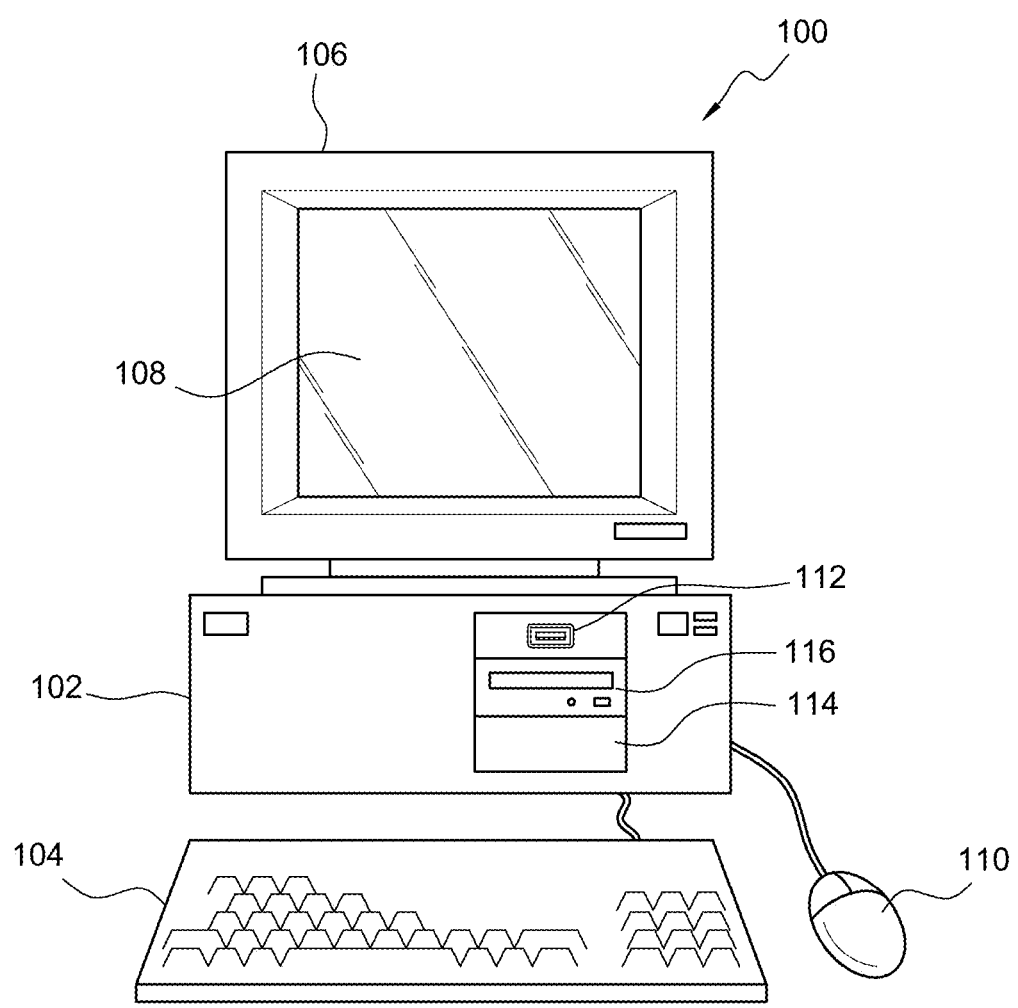
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, or ten seconds.

DESCRIPTION OF EXAMPLES OF EMBODIMENTS

Figure 2:
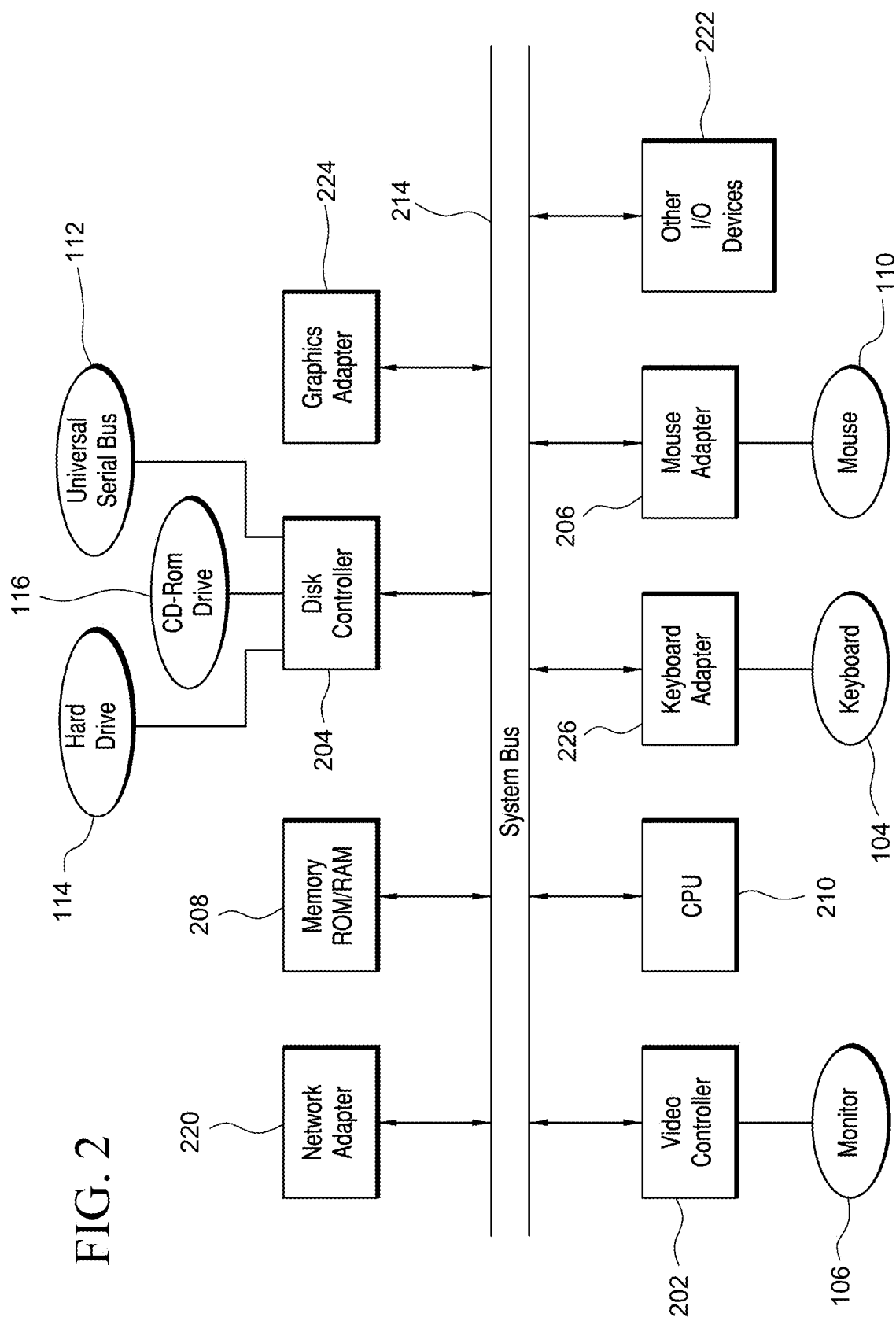
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
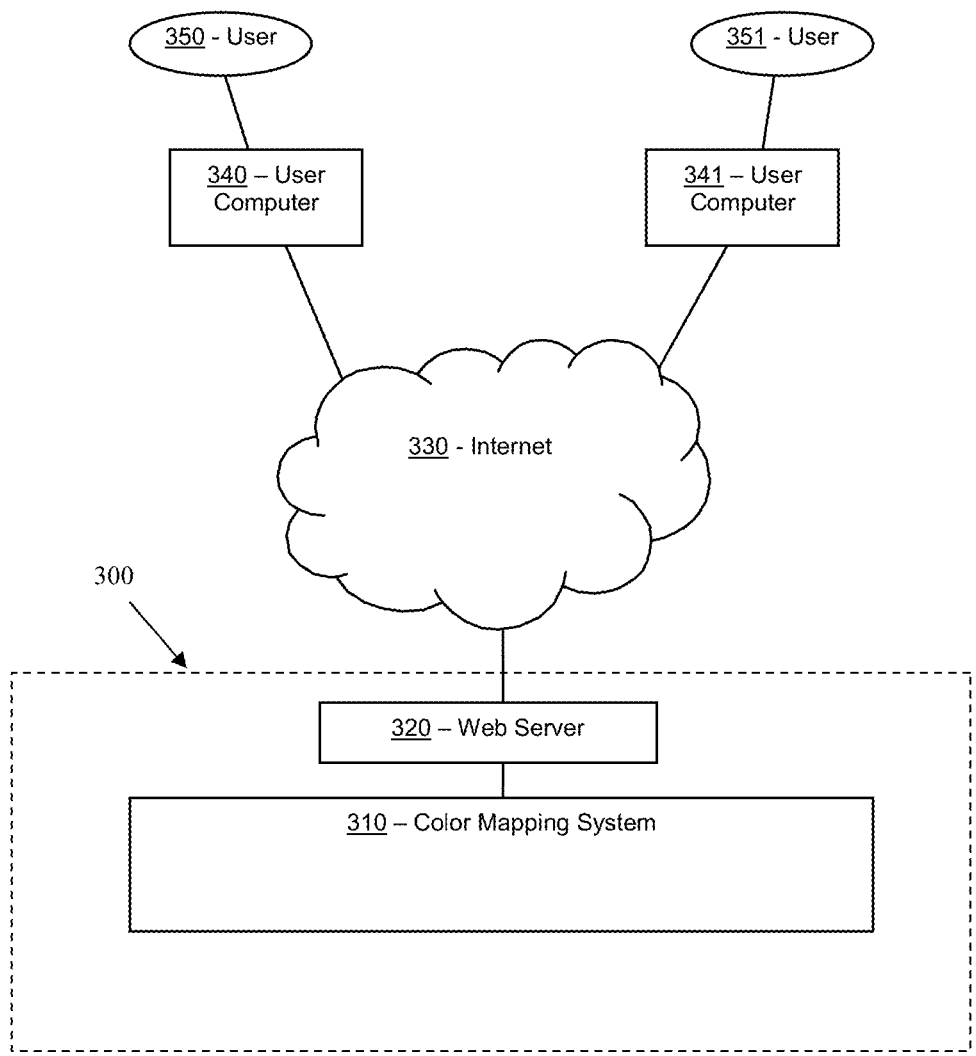
FIG. 3 illustrates a block diagram of a system that can be employed for extracting color from item images, according to an embodiment.

Turning ahead in the drawings, FIG. 3 illustrates a block diagram of a system 300 that can be employed for extracting color from item images, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can be used for extracting color from item images and/or can be capable of determining one or more dominant colors of the object in the image and percentages of each of the one or more dominant colors. In some embodiments, system 300 can reproduce the object in the image of an item with colors from a color palette. In many embodiments, system 300 can include a color mapping system 310 and/or a web server 320. Color mapping system 310 and/or a web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, color mapping system 310 and/or a web server 320. Additional details regarding color mapping system 310 and/or a web server 320 are described herein.

In a number of embodiments, each of color mapping system 310 and/or a web server 320 can be a special-purpose computer programed specifically to perform specific functions not associated with a general-purpose computer, as described in greater detail below.

In some embodiments, web server 320 can be in data communication through Internet 330 with one or more user computers, such as user computers 340 and/or 341. Internet 330 can be a public or private network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between color mapping system 310 within system 300. Accordingly, in some embodiments, color mapping system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, color mapping system 310 and/or a web server 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to color mapping system 310 and/or a web server 320, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of color mapping system 310 and/or a web server 320. In a similar manner, the processors and/or the non-transitory computer-readable media can be local and/or remote to each other.

Meanwhile, in many embodiments, color mapping system 310 and/or a web server 320 also can be configured to communicate with and/or include one or more databases and/or other suitable databases. The one or more databases can include a product database that contains information about products, items, or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between color mapping system 310 and/or a web server 320, and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN)

protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, color mapping system 310 can be a general-purpose computer or a special-purpose computer programmed to perform specific functions and/or applications. For example, color mapping system 310 can perform extracting background pixels using a first threshold. Color mapping system 310 also can perform extracting aliased pixels remaining on the perimeter of the object using a second threshold. In some embodiments, color mapping system 310 can perform identifying the dominant colors of the object in an image reproducing an image based on the original color of the object. In several embodiments, the dominant colors can be checked using a hue slice from a hue map comparing the RGB (red, green, and blue) value to the hue value of the slice.

Figure 4:
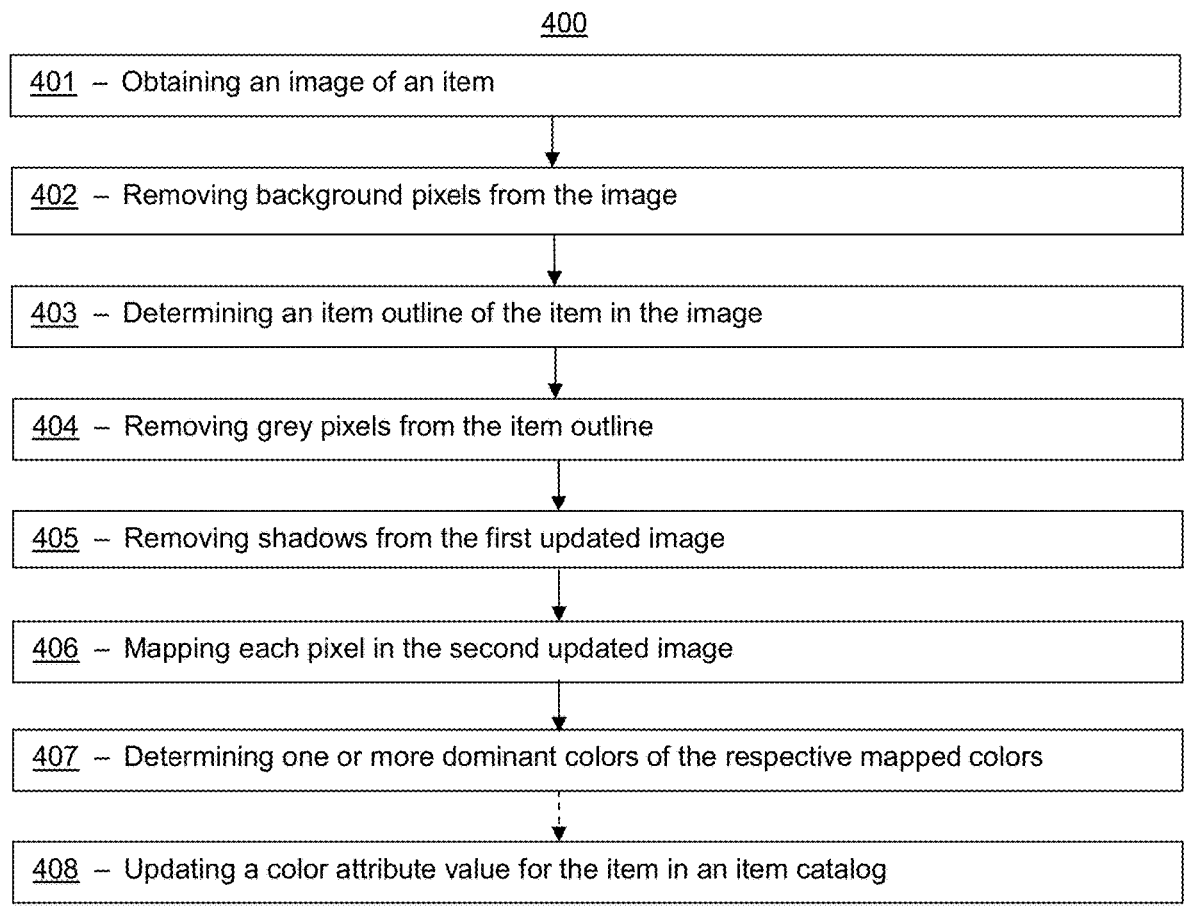
FIG. 4 illustrates a flow chart for a method, according to another embodiment.

Turning ahead in the drawings, FIG. 4 illustrates a flow chart for a method 400, according to another embodiment. In some embodiments, method 400 can be a method of automatically extracting color from item images determining one or more primary colors representing the color of the item in the image. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as color mapping system 310 and/or web server 320. The processor(s) can be similar or identical to the processor(s) described above with respect to computer system 100 (FIG. 1).

Referring to FIG. 4, method 400 can include a block 401 of obtaining an image of an item. In several embodiments, the item can be a product, such as an item provided through web server 320 (FIG. 3). In a number of embodiments, the image can be received from a seller (e.g., vendor, manufacturer, third party), such as being received along with other information about an item that is uploaded to be provided through web server 320 (FIG. 3). In several embodiments, the image can include a color image with a white background. In many embodiments, the image can be retrieved from an item catalog.

A color attribute, among other attributes, can be provided by sellers directly. When the seller is not restricted in what information is input as the color attribute value, many different unique colors can be included in the item catalog. For example, there can be over 700,000 unique color attribute values in the item catalog. Sellers can specify color and/or color names of an item in many ways including using basic color names, such as the color names black, blue, brown and/or other suitable color names. Sellers also can specify a color name for an item using a specific color shade rather than a dominant color name in a color palette, such as aqua, ivory, etc. The seller-supplied color names for an item often can be different than predetermined colors of a color palette when the entry of color attribute values is unstructured or unrestricted. Seller-supplied color attribute values can include many unique color values due to countless variations of color names, color shades, unstructured color names and/or unrestricted color names among other color related differences.

In various embodiments, the item catalog does not include a color attribute value for the item. In several embodiments, item information for a color attribute value of an item can include a generic term (description), such as multi-colored without one or more dominant colors in a color pattern. In many embodiments, item information for a color image of an object of an item can include new color names, or new color shades, such as aqua or ivory.

Conventionally, seller-supplied color names can be restricted to a set of normalized colors, such as a set of 18 normalized colors of a color palette. In approaches, seller-supplied color names can be mapped to normalized colors using rules. For example, a manually created rule can map a color and/or shade to a predetermined color of the set of normalized colors. A rule-based system can include thousands of manually created rules for color names and/or color shades, yet not cover every new variation of a color name and/or a color shade. Variations of new color names and/or new color shades are essentially limitless. Further variations of new color names and/or new color shades can include limitless degrees of color saturation, light values, and/or hues. A rule-based mapping system can be limited to the number of rules that can practically be created for each item with a new color and/or new shade of a color randomly chosen by sellers. Frequently, creating new rules for each new color name and/or color shade can be performed as a manual process. Many online catalogs can carry over 800, 000 items at any given time, thus creating new rules for the items can be an inefficient use of resources and impractical to maintain in real-time due to the scale of the images. Various challenges with mapping seller-provided color names and/or color shade names to a normalized set of colors can be increasingly more difficult to manage, posing a technical problem. New color names for new color shades can be constantly introduced by sellers for new items with color images of an object in the item. A significant effort can be involved to keep creating additional rules as each new color involves a new rule to map the new color the set of normalized colors.

The rules created in a rule-based mapping system can fail to resolve each of the color names and/or color shade names into any one of the normalized colors. For example, the color name provided by the seller can be ambiguous without having a set definition of the color intended to be the original color of the item.

A rule-based mapping system can include inconsistent naming protocols and/or procedures due the variability inherent in any manual process, which can involve subjective interpretation of missing and/or ambiguous color information causing the technical problem. Such variability in color names can lead to quality issues lacking consistency and/or standards with the new colors and/or new color shades. Some color names and/or color shade names can be mapped to one or more incorrect normalized colors.

Sellers also can describe a color name by mixing two colors of the set of normalized colors. For example, an item can be labelled "Yellow Green." It can be possible that the item is a yellowish green color or a greenish yellow color or the item can simply be partly yellow and partly green. In such a case, an additional color description, such as "Yellowish Green" could describe a yellowish version of green. Further, a retailer receiving a color image of an item from a seller can assume the color name is the original color intended by the seller.

Many sellers provide the item information of an item without a color label. In other cases, sellers can label some items as multicolor without mentioning the constituent colors that make up the multicolor image. For example, if an item is red and grey, a seller can refer to the color as multicolor without mentioning that the multicolor includes two dominant colors, such as red and grey. Such an item can be mapped to a color in the color set using a search query if the query involved red or grey.

Another challenge with using a rule-based mapping system can involve a seller providing a main or dominant color for an item that actually has more than one dominant color in the image. In such a scenario, the secondary color can be useful when items have two main colors. Search results can be improved when the colors are disclosed, and/or when the percentage of each color of the colors is used in the search query.

Frequently, a seller can provide multiple colors for an item without the percentage of each color disclosed. For example, an item labelled "black, blue and yellow" can be ambiguous without knowing a percentage of each color, such as approximately equal amounts of each color or mostly blue with only some amount of black and yellow, and so on.

Automatically extracting color from item images can advantageously circumvent the inaccuracy and inconsistency of incorrectly mapping color names using conventional techniques described above. Specifically, extracting color from item images can provide a resolution to a problem in the industry by reliably identifying at least a primary color and, in some cases, a secondary color, of an item, which can beneficially eliminate the guesswork of color inherent in using the conventional method of rule-based mapping. In some embodiments, the system can identify at least two main colors (e.g., dominant colors) in an item image by using the image and by restricting the main colors to a predetermined set of colors, such as the colors depicted in the exemplary color palette in FIG. 12, described further below. In many embodiments, capturing the at least two main colors within a set of predetermined colors can include capturing a specific shade of a main color. For example, the color green can be categorized as either dark green, light green, olive green and/or regular green. As another example, for the color blue can be categorized as either light blue, navy blue and/or regular blue.

In some embodiments, method 400 also can include a block 402 of removing background pixels from the image by removing white pixels from the image up to a first threshold. In many embodiments, removing the white pixels from the image can exclude removing the edges of the item in the image and/or exclude removing the item color pixels from the edges. Often, the image can include an aliasing effect at the edges of the item, which can include an appearance of jagged edges around the border of the image. The item border can show the appearance of the jagged edges that can include white pixels, grey pixels and item color pixels.

In many embodiments, extracting color from item images can involve identifying a type of background format, such as a plain white background or complex background other than plain white. In several embodiments, determining the type of background can include extracting pixels along the border of the object captured in the image to determine whether the background is a white background or a complex background. In some embodiments, determining the type of background can include sampling the pixels surrounding the image. In several embodiments, sampling the pixels can include extracting the topmost (e.g., farthest from the top) and bottommost (e.g., farthest from the bottom) 30 rows of pixels and the leftmost (e.g., farthest from the left) and the rightmost (e.g., farthest from the right) 30 columns of pixels of the image. In many embodiments, determining the type of background can be based on a threshold number to ascertain a percentage of the type of pixels, such as white, black, blue, and/or any other suitable color of pixel detected within the sample from the sampling. In several embodiments, the threshold can be used to ascertain whether any of the pixels are white. In some embodiments, if eighty percent (80%) or more of the pixels from the sample are white, then the image can be classified as having a "white" background. In various embodiments, if less than eighty percent (80%) of the pixels from the sample are white, then the image can be classified as a complex background (e.g., a non-white background).

Jumping ahead in the drawings, FIG. 6 illustrates exemplary images 610 and 620, showing the removal of white pixels from the white background of an image. FIG. 7 shows an enlarged view of a portion of FIG. 6, showing aliased edges of an item. Image 610 includes an item 612, namely, a wooden table, and a white background 611. After applying a white background removal to image 610, such as to remove white background 611, image 610 can be updated as shown in image 620. In image 620, removed pixels 621 around item 612 can be represented for explanatory purposes using a different color, such as red, as shown in FIG. 6. The white removal can involve using the first threshold that is a lower threshold compared to a second threshold used for removing grey pixels in the border region, so as to retain the color of item 612, even when item 612 includes near-white pixels.

As shown in FIG. 7, an aliasing effect can include a jagged appearance of aliased pixels 723 on the border of item 612.

Returning to FIG. 4, the first threshold can include an inequality, as shown in expression 1:

$$|r-1|+|g-1|+|b-1|<0.05, \quad (1)$$

where r represents a red value of an RGB color value; g represents a green value of the RGB color value, and b represents a blue value of the RGB color value. In many embodiments, the first threshold can be based on an RGB value, (r, g, b), where each channel is in [0, 1], such that RGB values on the scale of 0-255 can be divided by 255. In other embodiments, another suitable value and/or condition for the first threshold can be used. In several embodiments, a pixel can be marked as white if it satisfies the inequality in expression 1, described above, and can be removed from the image. Conventionally, RGB values of white in a background used for an image of an item can be a purer white pixel color than the white pixel color in the image of the item so that a white item in the image can still be visible when placed on a white background (e.g., 611). In various embodiments, if the image is also white (e.g., white pixel color), the first threshold can be set so as to retain (e.g., not remove) the near-white pixels of the item. In some embodiments, the first threshold to remove the white background (e.g., 611) can be set to remove purer white color pixels and retain the white pixel color in the image of the item.

In many embodiments, a pixel can be retained if it does not satisfy the inequality in expression 1, described above.

In several embodiments, method 400 further can include a block 403 of determining an item outline of the item in the image. In a number of embodiments, the item outline can include aliased pixels along a periphery of the item in the image. For example, the aliased pixels can be similar or identical to aliased pixels 723 (FIG. 7). In many embodiments, aliasing can occur when item images are stored in a compressed format, such as JPEG. The compression can causes artifacts in the image, including aliasing which causes grey pixels to appear between the pixels of the item (e.g., 612) and the white background (e.g., 611), as illustrated in FIG. 7.

In a number of embodiments, block 403 of FIG. 4 can include determining an item outline of the item in the image by generating an outer outline mask and an inner outline mask of the item in the image. In several embodiments, block 403 further can include generating an item outline mask by subtracting the inner outline mask from the outer outline mask. In some embodiments, block 403 additionally an include determining the item outline based on the item outline mask. In many embodiments, attenuating the effects of aliasing can include extracting the pixels along the periphery of the image, (e.g., the outline of the object in the image). In several embodiments, the outline of the image can include the aliased pixels and original color pixels of the image.

Figure 8:
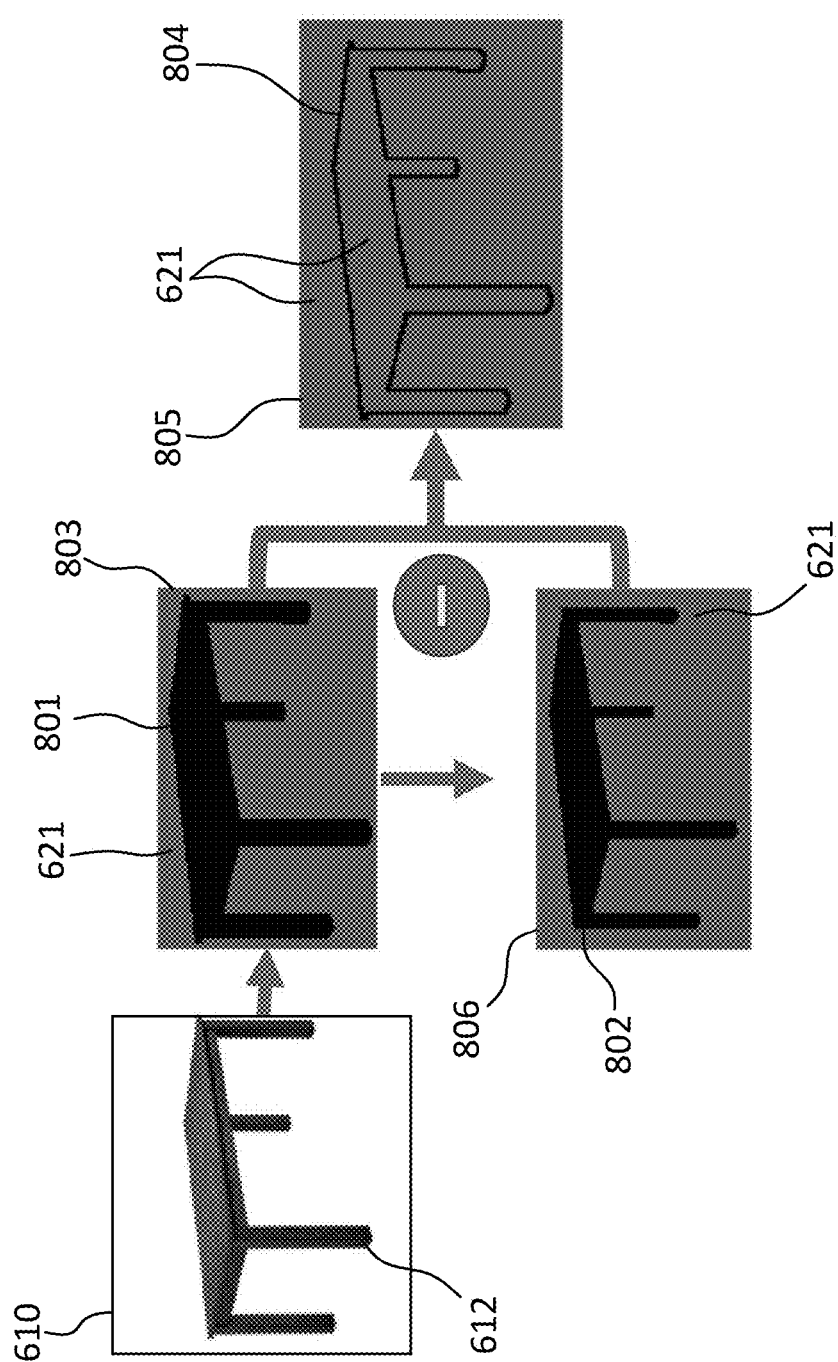
FIG. 8 illustrates exemplary images in a process of generating an item outline mask.

Jumping ahead to the drawings, FIG. 8 illustrates exemplary images in a process of generating an item outline mask. FIG. 8 includes image 610 including item 612, an image 803 showing an outer outline mask 801, an image 806 including an inner outline mask 802, and an image 805 showing an item outline mask 804. Applying the first threshold in block 402 for white pixels can generate a binary mask (e.g., outer outline mask) of the image, such as shown in outer outline mask 801, which can be the portions (as shown in black) of the image other than removed pixels 621. Removed pixels 621 can be dilated, such that the portions (as shown in black) of the image other than removed pixels 621 (as dilated) are a smaller version of the item (e.g., 612), as shown in inner outline mask 802. The dilation can involve expanding the removed pixel region by a distance of 5 pixels, or another suitable number of pixels, from a boundary of outer outline mask 801. Inner outline mask 802 can be subtracted from outer outline mask 801 to obtain item outline mask 804. Item outline mask 804 can be a binary mask in which the pixels in black represent regions of the original image that are part of the outline of item 612.

Returning to FIG. 4, in several embodiments, method 400 additionally can include a block 404 of removing grey pixels from the item outline in the image up to a second threshold to create a first updated image. In many embodiments, the second threshold is greater than the first threshold. In several embodiments, the second threshold can more aggressively remove the white and/or grey pixels from the item outline, as described in expression 2 below. In various embodiments, applying the second threshold to the item outline can retain near-white pixels in the item.

In some embodiments, the second threshold can be based on item boundary removal criteria. In several embodiments, the item boundary removal criteria can be described as follows:

$$|r-1|+|g-1|+|b-1|<0.1 \text{ and } m-s<10, \quad (2)$$

where r represents a red value of an RGB color value; g represents a green value of the RGB color value, b represents a blue value of the RGB color value (where r, g, and b are scaled to [0, 1] by dividing values of R, G, and B in the range of [0, 255] by 255), m represents a middle second highest value of the RGB color value, and s represents a minimum of R, G, and B. In many embodiments, the second threshold applies a more aggressive threshold for white pixel and grey pixels when removing aliased pixels.

Figure 9:
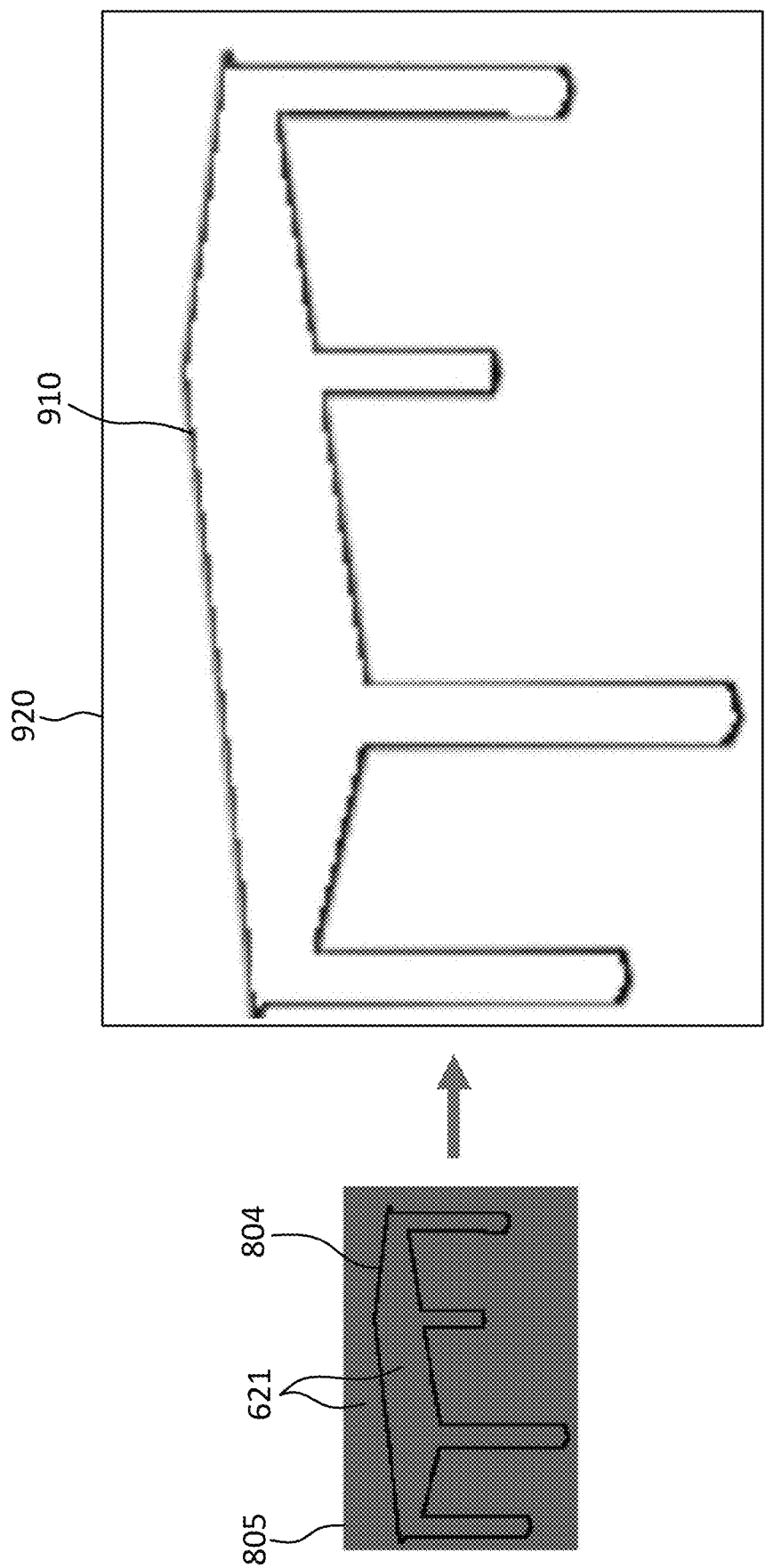
FIG. 9 illustrates an exemplary image showing the item outline mask of FIG. 8 and an exemplary image showing an item outline.

Jumping ahead in the drawings, FIG. 9 illustrates an exemplary image 805 showing item outline mask 804 and an exemplary image 920 showing an item outline 910. Item outline 910 is the portion of the image that corresponds to item outline mask 804. Thresholding can leave a grey boundary area around the item. Item outline 910 shows full edge aliasing, which can include original color pixels of the item and grey pixels. The grey pixels can be removed with a more aggressive removal threshold, such as the second threshold applied in block 404 (FIG. 4).

Figure 10:
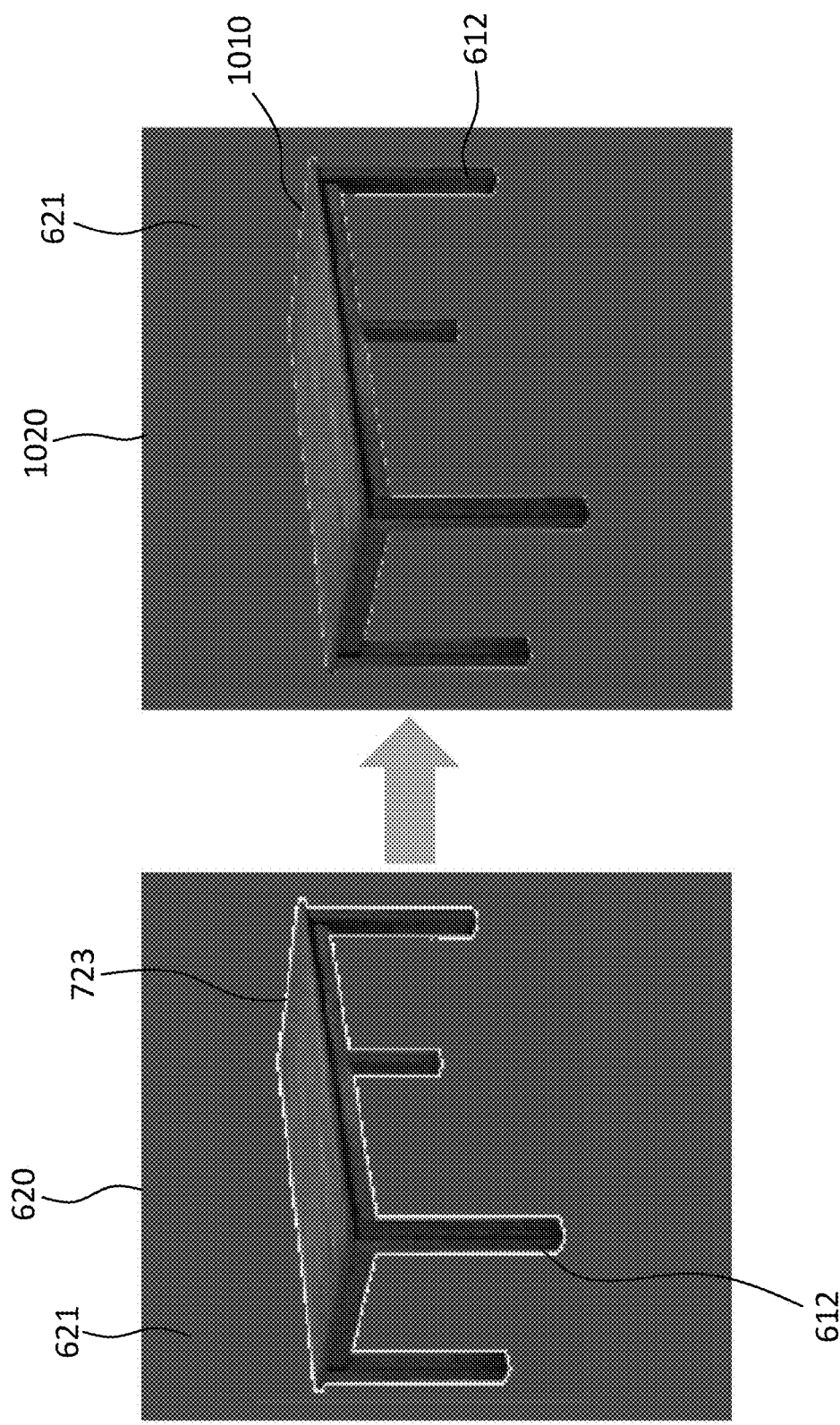
FIG. 10 illustrates the first image of FIG. 6 and an updated image, which show removal of grey pixels in the item outline using a second threshold.

Turning ahead in the drawings, FIG. 10 illustrates images 620 and an image 1020, which show removal of grey pixels in the item outline using the second threshold. Image 1020 includes an anti-aliased outline 1010, in which grey portions of aliased pixels 723 have been removed, which illustrates an advantage of using an anti-aliasing technique to remove the aliased pixels where the second threshold removes the grey aliased pixels up to the second threshold in the item outline. The item outline (e.g., 910 (FIG. 9)) can be a width of 5 pixels in some examples, or another suitable width. The anti-aliasing technique can advantageously remove white and/or grey pixels without removing original color pixels of the main portion (e.g., no outline portion) of the item.

Returning to FIG. 4, method 400 also can include a block 405 of removing shadows from the first updated image to create a second updated image based on a saliency map and a third threshold for shadow-like grey pixels. In many embodiments, the saliency map can be used in combination with thresholds for shadow pixels to remove shadows from an image. The saliency map can be a conventional saliency map, such as a deep learning model that can identify shadow pixels in an image. Frequently shadows in an image can be artifacts of other pixels, thus saliency maps often do not retain shadow pixels.

In several embodiments, removing shadows from images can include using the saliency map to determine which grey pixels are part of the image and to remove shadow pixels that are not part of the image. Using conventional saliency maps without thresholding can result in erroneously removing grey pixels that are part of the image. In many embodiments, the saliency map can be used to mark regions of grey pixels which can be removed. In some embodiments, the third threshold for grey shadow-like pixels can determine the grey shadow-like pixels that are not part of the image that can be removed. In various embodiments, the third threshold can retain pixels in the images that are not shadow-like grey in color.

In several embodiments, the third threshold for shadow-like grey pixels can include a saturation level below a predetermined saturation level on a color saturation scale and a light value below a predetermined light value. In many embodiments, the third threshold can include removing the shadow-like grey pixels when saturation <10 and value <250.

In various embodiments, the third threshold for shadow-like grey pixels also can include:

$$(R-G)<2 \text{ and } (G-B)<2 \text{ and } (R-B)<2 \quad (4)$$

Where R represents a red value of an RGB color value; G represents a green value of the RGB color value, and B represents a blue value of the RGB color value on the 0-255 scale.

Figure 11:
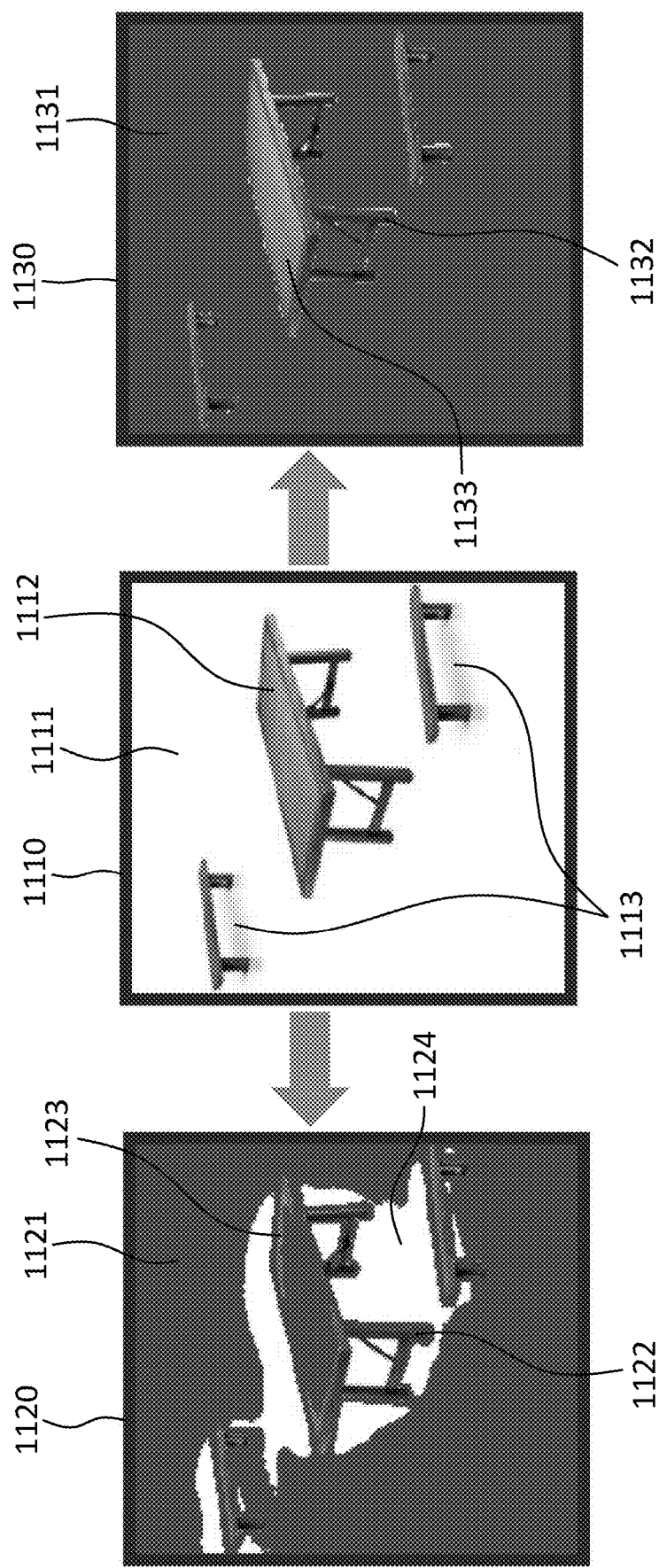
FIG. 11 illustrates exemplary images showing using saliency maps with and without a third threshold.

Jumping ahead in the drawings, FIG. 11 illustrates exemplary images 1110, 1120, and 1130, showing using saliency maps with and without the third threshold. Image 1110 includes items 1112 (e.g., a table and two benches) that have grey shadows below them in the image. Image 1110 also includes a white background 1111. Image 1110 also includes a shadow area 1113 under the two benches in item 1112. A portion of image 1112 includes a grey color on the surface of the table. Image 1120 shows how using the saliency map without thresholding can remove areas of grey coloring that are not shadows. Image 1120 also demonstrates an incomplete removal of the white background using the saliency map, where portions 1121 of the white background that are removed are colored in red for illustrative purposes. Image 1120 also illustrates that original color pixels 1122 of the item without grey color remains as part of the image. Image 1120 also illustrates an incorrect removal portion 1123 of grey pixels that are part of the item, based on using the saliency map without thresholding. Image 1120 also illustrates white pixels 1124 in the white background that were erroneously retained, based on using a saliency map without thresholding.

Image 1130 illustrates using thresholding with the saliency maps, such as applying the third threshold in conjunction with the saliency map to remove white and grey pixels from image 1130. Image 1130 illustrates removal of white background 1131, as indicated by the red coloring in the image. Image 1130 also illustrates original color pixels 1132 of the item without grey color remaining as part of the image of the item. Image 1130 also illustrates grey colored item portions 1133 that are not removed from image 1130. Image 1130 also illustrates aliased pixels 1134 around the border of the item after extracting the white pixels in the white background. Image 1130 demonstrates removing the white and grey pixels from the image that are shadows and not part of the image using the third threshold and the saliency map, which beneficially is more accurate than the saliency map technique without thresholding shown in image 1120.

Returning to FIG. 4, in a number of embodiments, method 400 further can include a block 406 of mapping each pixel in the second updated image to a respective mapped color in a predetermined color palette.

Figure 12:
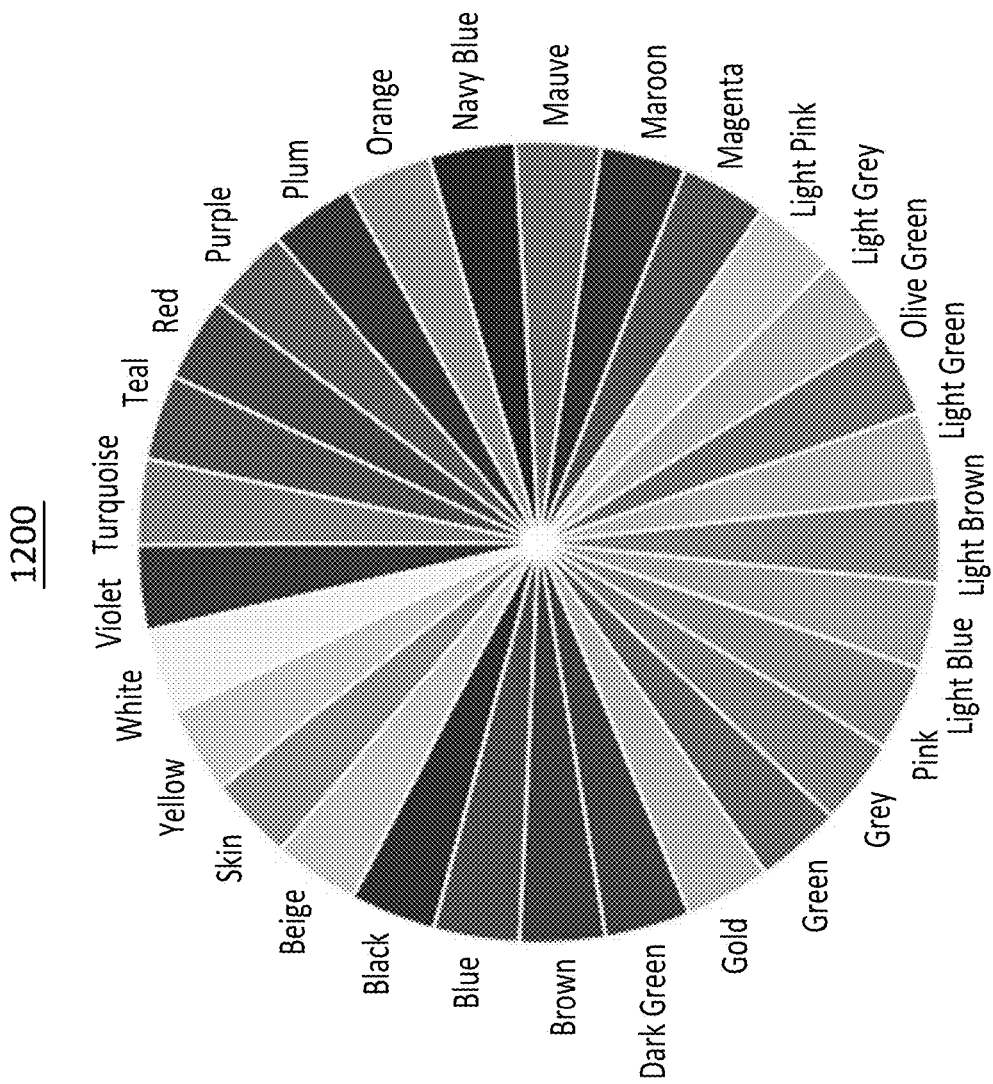
FIG. 12 illustrates an exemplary color palette.

Jumping ahead in the drawings, FIG. 12 illustrates an exemplary color palette 1200. In several embodiments, once the background pixels (e.g., white and/or grey pixels) and/or the shadows are removed, each pixel that is part of the item remaining in the images can be mapped to a color in the color palette, such as in color palette 1200 in FIG. 12. In various embodiments, mapping the color to the color palette can include determining a distance between each pixel's CIE LAB (International Commission on Illumination color space) value and the CIE LAB value for each color in the color palette to find the closest matching color, such as using the CIE2000 Delta-E distance.

Figure 14:
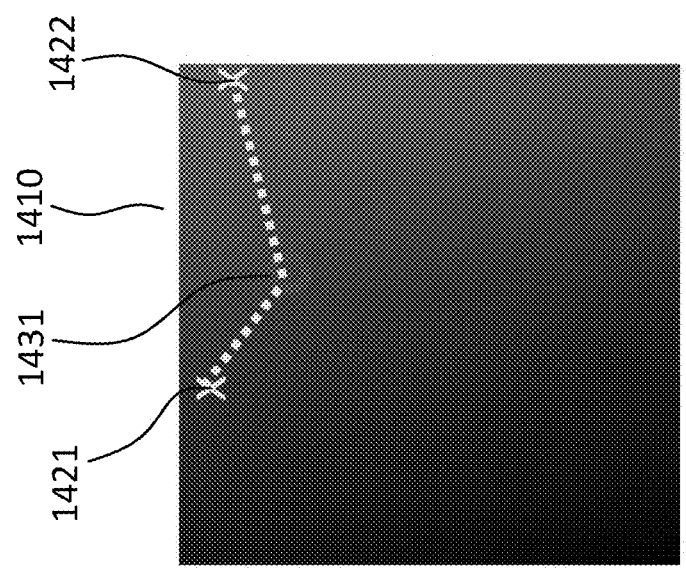
FIG. 14 illustrates an exemplary image, showing determining a closest color in a color palette based on distance.

Jumping ahead in the drawings, FIG. 14 illustrates an exemplary image 1410 showing determining a closest color in a color palette, based on distance. Image 1410 illustrates an exemplary RGB cube slice for blue and violet. Image 1410 includes centroids 1421 (X in the blue area) and 1422 (X in the violet area). A pixel 1431 can be mapped to the centroid that is at a shortest Euclidean distance from the centroid, which can be centroid 1421. If the centroid for a color is not picked with care, colors that do not appear to match the centroid can be mapped to the centroid. For example, the purplish color of pixel 1431 can be mapped to the blue color of centroid 1421 by using shortest Euclidian distance. By more carefully picking centroids for colors, such inconsistent mappings can be limited or eliminated.

Returning to FIG. 4, in many embodiments, block 406 of mapping the each pixel in the second image to the respective mapped color in the predetermined color palette can include precomputing a mapping from each possible RGB color value to a respective color in the predetermined color palette based on a distance between the each possible RGB color value and the respective color in the predetermined color palette. 24-bit RGB images use 8 bits for each of the R, G, and B channels of the image. The value of each channel can range from 0 to 255. Therefore, there are a total of $256^3$=16, 777,216 possible unique RGB values. An advantage of pre-computing the distance between each of the product pixels and the centroids of the different colors an increase the speed of matching a color to a color palette. For example, a distance calculation using CIE2000 Delta-E can be a slow process. Instead of re-doing the distance calculations for every image, precomputing and indexing the distances can save time and computing resources. In many embodiments, given the approximate 16 million unique RGB values, computing a distance to each of the colors in the color palette can include identifying the closest color label in the color palette. In some embodiments, each of the 16 million pixels can include a predetermined a color label that can be used to look up the color label for each pixel instead of manually computing the distance to each of the colors in the color palette. In some embodiments, block 406 can also include storing the respective color labels in a linear index array that is indexed based on the each possible RGB color value. In many embodiments, block 406 further can include using the linear index array to map the each pixel in the second updated image, as updated, to the respective mapped color. In several embodiments, linear indexing for the pre-computed color labels can decrease processing time.

In several embodiments, precomputing color labels for each pixel, [R, G, B], can include approximately 16 million potential RGB values. In many embodiments, computing the distance between the [R, G, B] and each centroid in color palette using the CIE Delta E lab distance can include identifying the closest (e.g., least distant) color in the color palette. For example, let the closest color be called a color label. If the [R, G, B] is [0, 0, 0], computing the distance between this value and the color palette will identify a color label of black. In several embodiments, identifying the closest color can include identifying the color label for the [R, G, B] value. In some embodiments, the color label for the [R, G, B] value can be stored into an array by using the equations 5 and 6:

$$\text{linear index} = R + G*256 + B*256^2 \quad (5)$$

$$\text{colors\_array[linear index]} = \text{color label} \quad (6)$$

where R represents a red value of an RGB color value; G represents a green value of the RGB color value, and B represents a blue value of the RGB color value.

In several embodiments, given array colors_array of color labels, a color identification algorithm can readily be changed to lookup the pre-computed distances using the array colors_array. For example, for each product pixel, the linear index for the color of the pixel, can be generated using equation 5, above, and this linear index can be used in the array colors_array to determine the color label.

In various embodiments, block 406 of mapping the each pixel in the second updated image also can include verifying that the respective mapped color matches a color in a set of predetermined colors for a hue slice in an HSV space (hue, saturation, and value). In some embodiments, using manual tagging of hue slices to improve results can increase accuracy of the chosen centroids for the different colors in the color palette. In several embodiments, it can be possible that the centroid can result in incorrect labels for some of the over 16 million potential RGB values. In many embodiments, a manual tagging approach can help improve the accuracy of the final results without having to tag individual pixels. In some embodiments, the distance (e.g., distance determined using CIE Delta E 2000) can match a color to a color in the color palette that is not accurate. Each pixel has a unique hue value that can be mapped to a set of color names. In the HSV space, hue is an angle between 0 and 359, such that there are 360 hue slices. In some embodiments, a manually created list of colors can be created for each degree. In several embodiments, improvements to hue color names can include using a hue color list. For example, for each pixel [R, G, B], the hue can be computed: [R, G, B]=>[H, S, V]. For the hue (H) value, the mapped color name can be checked in the hue list, such as, for H=180, the hue list can be [Green, Blue, Teal, Turquoise, Cyan, Black, Grey, White]. The distance can be computed against the colors. An advantage of using hue slices can be an increase in speed as the distance can be computed against fewer colors. For example, a Hue=180: 8 colors instead of 30 colors in a color palette. Another advantage can include an increased accuracy as a color can be matched to a colors limited by the Hue list, which can reduce errors. For example, Hue 180 has a 1:8 chance of being correct versus a 1:30 chance.

The RGB cube contains approximately 16 million pixels. The values can equivalently be viewed in HSV scale. For example, of the 360 hue channels in the HSV space, a cross-section of the HSV space at an angle of 180 degrees can show a limited number of colors found on this hue slice, such as green, blue, teal/turquoise, black, grey and white, as described in further detail in connection with FIG. 15 below. Black, grey, and white pixels can have a tinge of other colors in a hue slice and can be misclassified. In hue slices, black is on the left, grey is at the top left and white is at the top right.

Figure 15:
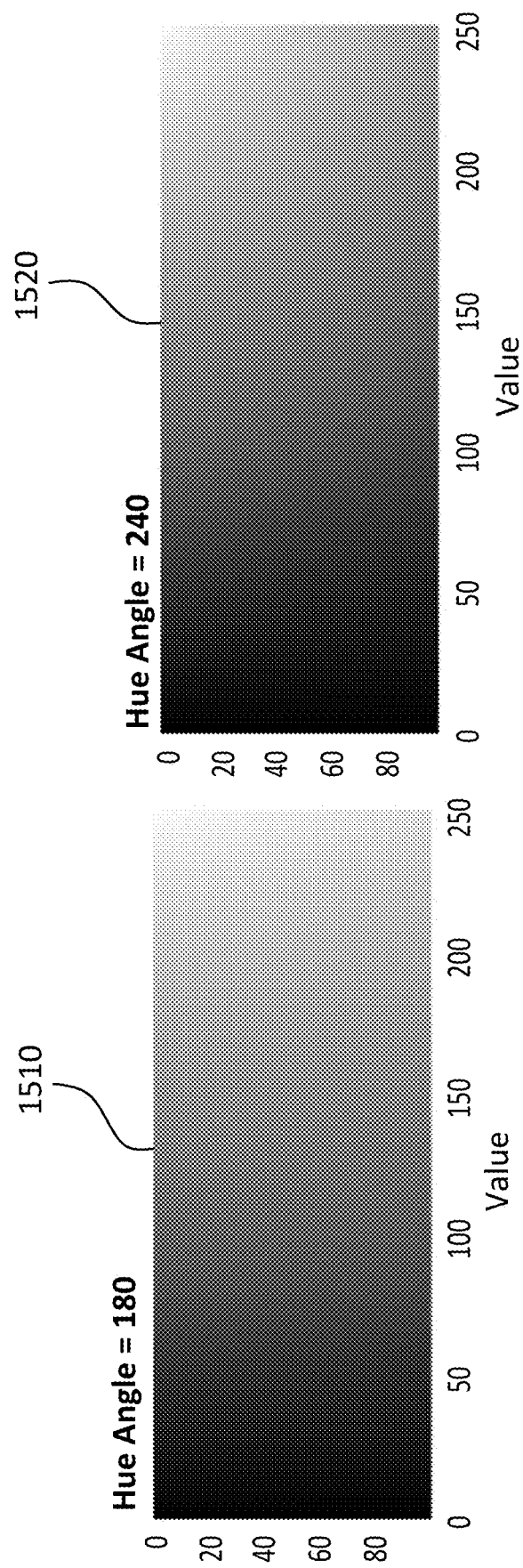
FIG. 15 illustrates exemplary images showing hue slices.

Jumping ahead in the drawings, FIG. 15 illustrates exemplary images 1510 and 1520 showing hue slices. Images 1510 and 1520 illustrating two different hue slices. Image 1510 illustrates a cross-section of the HSV space at an angle of 180 degree out of the 360 hue channels in the HSV space. For this hue slice, the colors that can be in the hue list for this slice are: Green, Blue, Teal/Turquoise, Black, Grey, White. In some embodiments, when an RGB value can have a hue value of 180, the colors can be limited to one of Green, Blue, Teal/Turquoise, Black, Grey, or White. Image 1520 illustrates a hue slice for hue angle 240. For this hue slice, the hue list can be a different list of colors.

Centroid-based matching can map to a color that can be different from the actual color of the item. In several embodiments, manual annotations can be used to check the accuracy (e.g. mapping to a color) of the list of colors generated by the automatic mapping. In some embodiments, based on manual annotation, the automatic mapping was incorrect. For such cases, it can be likely that the second-closest centroid in the color palette was the correct color. In that case, checking the label can include accepting the color if it is in the manually tagged list for the hue of 180 degrees. If the color is incorrect, the third closest centroid can be matched and so forth resulting in automatically improving the color mapping using the centroids.

Returning to FIG. 4, in many embodiments, block 406 of mapping the each pixel in the second updated image additionally can include verifying that the respective mapped color matches a color in a respective set of predetermined colors in one of a black-grey-white region or a color region of a hue slice in an HSV space. In many embodiments, the black, grey, and white region of a hue slice can be separated from the color region of a hue slice.

Figure 16:
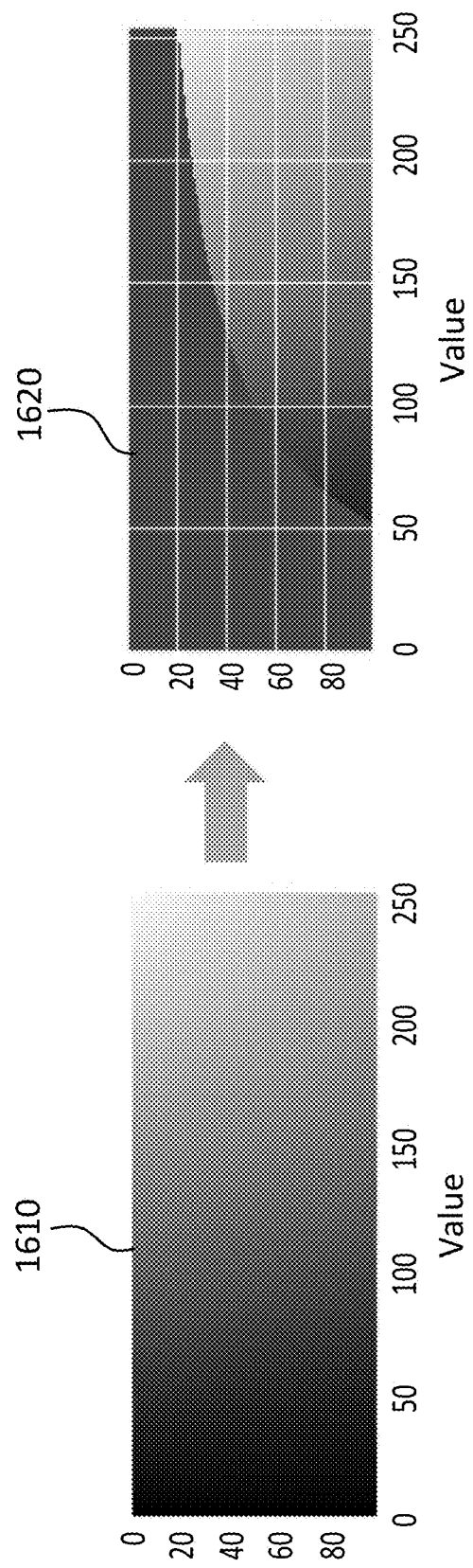
FIG. 16 illustrates an exemplary image of a hue slice and an exemplary image showing separating the hue slice into a black, grey, and white region, and a color region.

Jumping ahead in the drawings, FIG. 16 illustrates an exemplary image 1610 of a hue slice and an exemplary image 1620 separating the hue slice into a black, grey, and white region, and a color region. Image 1620 illustrates using regions on hue slices to separate the hue slice into a first region that is black, grey, or white, and a second region that includes a dominant R, G, or B component. For example, in the hue slices in images 1610 and 1620, R is dominant. The black, grey, white portion can be determined by calculating G−B<threshold. Image 1620 illustrates a hue slice showing the separation of the black, grey, white region from the color region on the hue slice.

Figure 17:
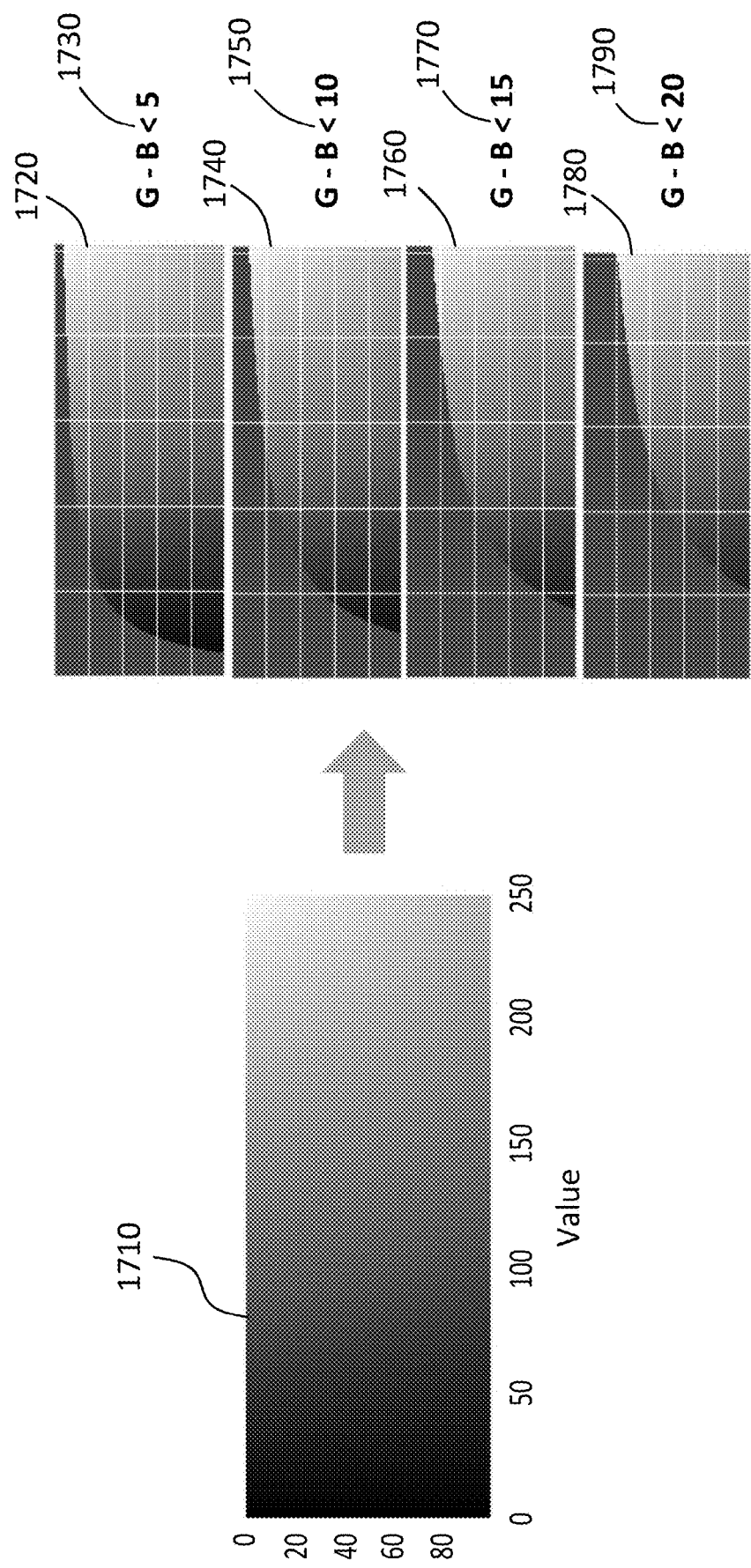
FIG. 17 illustrates exemplary images of hue slices with different sizes of regions based on different thresholds separating the black, grey, and white region of the hue slice from the color region.

Turning ahead in, FIG. 17 illustrates exemplary images of hue slices with different sizes of regions based on different thresholds separating the black, grey, and white region of the hue slice from the color region. Image 1710 illustrates an exemplary hue slice. Images 1720, 1740, 1760, 1780 illustrate varying degrees of separation of the black, grey, white regions on the hue slice based on the different threshold values. Criteria 1730, 1750, 1770, and 1790 specify different threshold values for the black, grey, and white region of the hue slice.

Returning to FIG. 4, in several embodiments, method 400 also can include a block 407 of determining one or more dominant colors of the respective mapped colors based on one or more highest respective percentages of the respective mapped colors. In many embodiments, mapping each pixel to a color on the color palette can include generating a percentage of dominant colors. Conventionally, color-determination methods can use deep learning techniques and/or can be based on clustering approaches. An advantage of extracting color from item images using the techniques described herein can include a variation of color quantization with a novel anti-aliasing technique catered to the application. Additionally, the method can be unsupervised compared to deep learning techniques.

Figure 13:
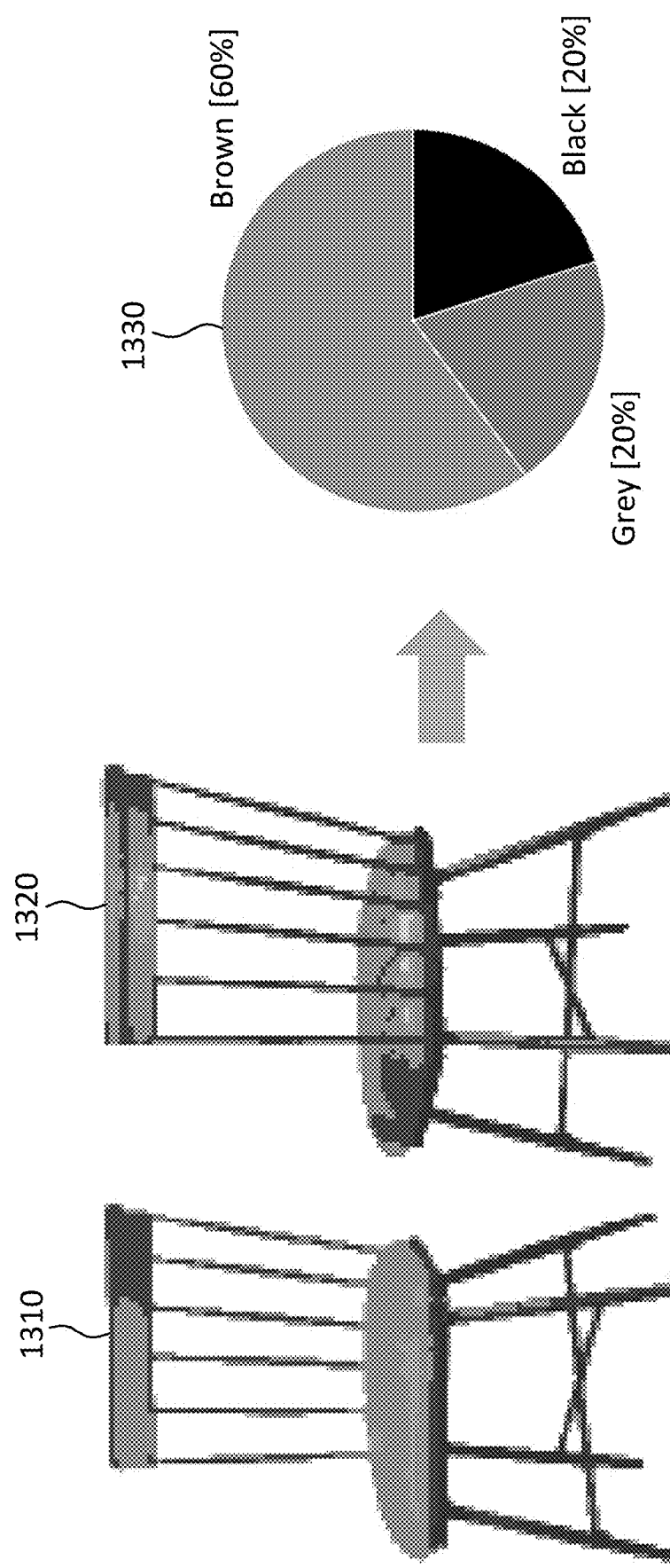
FIG. 13 illustrates exemplary images showing reproducing images using colors in a color palette and determining dominant colors and the percentage of each.

In several embodiments, identifying dominant colors can include first removing white background pixels and shadow pixels, as described above. In many embodiments, matching each pixel to a color in a color palette can include assigning each pixel one color tag, for example, brown or black, as described above. In some embodiments, computing the frequency of each color can include outputting unique dominant colors and the percentages of the dominant colors. Jumping ahead in drawings, FIG. 13 illustrates exemplary images showing reproducing images using colors in a color palette, and determining dominant colors and the percentage of each. Image 1310 can include an item that uses pixels with a broad spectrum of colors, such as an image in an item catalog of an item (e.g., a chair). Image 1320 illustrates a reproduction of image 1310 when the colors at each pixel are mapped to one of the predetermined colors of a color palette (e.g., 1200 (FIG. 12). Graph 1330 shows the dominant colors and percentage of colors used in image 1320. In this example, brown is the dominant color.

Returning to FIG. 4, in various embodiments, method 400 optionally can include a block 408 of updating a color attribute value for the item in an item catalog based on the one or more dominant colors. For example, if the color attribute value for the item represented by image 1310 (FIG. 13) is blank or something other than brown, the color attribute value for the item can be updated to be brown.

Turning to the next drawing, FIG. 5 illustrates a block diagram of system 300, according to the embodiment shown in FIG. 3. Color mapping system 310 and/or web server 320 are merely exemplary and are not limited to the embodiments presented herein. Color mapping system 310 and/or web server 320 can be employed in many different embodiments or examples not specifically depicted or described herein. In some embodiments, certain elements or systems of color mapping system 310 and/or web server 320 can perform various procedures, processes, and/or acts. In other embodiments, the procedures, processes, and/or acts can be performed by other suitable elements or systems. In many embodiments, the systems of color mapping system 310 and/or web server 320 can be modules of computing instructions (e.g., software modules) stored at non-transitory computer readable media. In other embodiments, the systems of color mapping system 310 and/or web server 320 can be implemented in hardware.

In many embodiments, color mapping system 310 can include a communication system 511. In a number of embodiments, communication system 511 can at least partially perform block 401 (FIG. 4) obtaining an image of an item.

In several embodiments, color mapping system 310 also can include a pixel detection system 512. In various embodiments, pixel detection system 512 can at least partially perform block 402 (FIG. 4) of removing background pixels from the image by removing white pixels from the image up to a first threshold, and/or block 403 (FIG. 4) of determining an item outline of the item in the image.

In some embodiments, color mapping system 310 also can include color extraction system 513. In many embodiments, color extraction system 513 can at least partially perform block 404 (FIG. 4) of removing grey pixels from the item outline in the image up to a second threshold to create a first updated image.

In some embodiments, color mapping system 310 also can include shadow extraction system 514. In many embodiments, shadow extraction system 514 can at least partially perform block 405 (FIG. 4) block 405 (FIG. 4) of removing shadows from the first updated image to create a second updated image based on a saliency map and a third threshold for shadow-like grey pixels.

In some embodiments, color mapping system 310 also can include mapping system 515. In many embodiments, mapping system 515 can at least partially perform block 406 (FIG. 4) of mapping each pixel in the second updated image to a respective mapped color in a predetermined color palette, block 407 (block 407) of determining one or more dominant colors of the respective mapped colors based on one or more highest respective percentages of the respective mapped colors, and/or block 408 (FIG. 4) of updating a color attribute value for the item in an item catalog based on the one or more dominant colors.

In several embodiments, web server 320 can include a webpage system 522. Webpage system 522 can at least partially perform sending instructions to user computers (e.g., 350-351 (FIG. 3)) based on information received from communication system 511.

In many embodiments, the techniques described herein can be used continuously at a scale that cannot be handled using manual techniques. In a number of embodiments, the techniques described herein can solve a technical problem that arises only within the realm of computer networks, as extracting color from item images does not exist outside the realm of computer networks. Moreover, the techniques described herein can solve a technical problem that cannot be solved outside the context of computer networks. Specifically, the techniques described herein cannot be used outside the context of computer networks, as the computerized image processing techniques described herein to not exist outside computer networks.

A number of embodiments include a system. The system can include one or more processors and one or more non-transitory computer-readable media storing computing instructions configured to run on the one or more processors and perform certain acts. The acts can include obtaining an image of an item. The acts also can include removing background pixels from the image by removing white pixels from the image up to a first threshold. The acts further can include determining an item outline of the item in the image, wherein the item outline comprises aliased pixels along a periphery of the item in the image. The acts additionally can include removing grey pixels from the item outline in the image up to a second threshold to create a first updated image, wherein the second threshold is greater than the first threshold. The acts further can include removing shadows from the first updated image to create a second updated image based on a saliency map and a third threshold for shadow-like grey pixels. The acts also can include mapping each pixel in the second updated image to a respective mapped color in a predetermined color palette. The acts additionally can include determining one or more dominant colors of the respective mapped colors based on one or more highest respective percentages of the respective mapped colors.

Various embodiments include a method. The method can include being implemented via execution of computing instructions configured to run at one or more processors and stored at one or more non-transitory computer-readable media. The method can include obtaining an image of an item. The method also can include removing background pixels from the image by removing white pixels from the image up to a first threshold. The method further can include determining an item outline of the item in the image, wherein the item outline comprises aliased pixels along a periphery of the item in the image. The method also can include removing grey pixels from the item outline in the image up to a second threshold to create a first updated image, wherein the second threshold is greater than the first threshold. The method further can include removing shadows from the first updated image to create a second updated image based on a saliency map and a third threshold for shadow-like grey pixels. The method also can include mapping each pixel in the second updated image to a respective mapped color in a predetermined color palette. The method also can include determining one or more dominant colors of the respective mapped colors based on one or more highest respective percentages of the respective mapped colors.

Although automatically determining a rule change event that can affect certain attributes of a product for display as expressed in a content catalog using a reactive attribute management platform has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-17 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
    one or more processors; and
    one or more non-transitory computer-readable media storing computing instructions configured to run on the one or more processors and perform:
        obtaining an image of an item;
        removing background pixels from the image by removing white pixels from the image based on a first criteria that depends on a first threshold;
        determining an item outline of the item in the image, wherein the item outline comprises aliased pixels along a periphery of the item in the image;
        removing grey pixels from the item outline in the image based on a second criteria that depends on a second threshold and a third threshold to create a first updated image, wherein the second threshold is greater than the first threshold;
        removing shadows from the first updated image to create a second updated image based on a saliency map and a third criteria for shadow-like grey pixels;
        mapping each pixel in the second updated image to a respective mapped color in a predetermined color palette; and
        determining one or more dominant colors of the respective mapped colors based on one or more highest respective percentages of the respective mapped colors.

2. The system of claim 1, wherein the first criteria comprises:

$$|r-1|+|g-1|+|b-1|<0.05,$$

where r represents a scaled red value of an RGB color value of a respective pixel; g represents a scaled green value of the RGB color value of the respective pixel, b represents a scaled blue value of the RGB color value of the respective pixel, and the first threshold is 0.05.

3. The system of claim 1, wherein the second criteria threshold comprises:

$$|r-1|+|g-1|+|b-1|<0.1 \text{ and } m-s<10,$$

where r represents a scaled red value of an RGB color value of a respective pixel; g represents a scaled green value of the RGB color value of the respective pixel, b represents a scaled blue value of the RGB color value of the respective pixel, m represents a middle value of R, G, and B color values of the RGB color value of the respective pixel on a [0, 255] scale, s represents a minimum of the R, G, and B color values of the RGB color value of the respective pixel, the second threshold is 0.1, and the third threshold is 10.

4. The system of claim 1, wherein determining the item outline of the item in the image further comprises:
    generating an outer outline mask and an inner outline mask of the item in the image;
    generating an item outline mask by subtracting the inner outline mask from the outer outline mask; and
    determining the item outline based on the item outline mask.

5. The system of claim 1, wherein the third criteria threshold for shadow-like grey pixels comprises:
    a saturation level below a predetermined saturation level on a color saturation scale; and
    a light value below a predetermined light value.

6. The system of claim 1, wherein the third criteria threshold for shadow-like grey pixels comprises:

$$(R-G)<2 \text{ and } (G-B)<2 \text{ and } (R-B)<2,$$

where R represents a red value of an RGB color value of a respective pixel; G represents a green value of the RGB color value of the respective pixel, and B represents a blue value of the RGB color value of the respective pixel.

7. The system of claim 1, wherein mapping the each pixel in the second updated image to the respective mapped color in the predetermined color palette further comprises:
  precomputing a mapping from each possible RGB color value to a respective color in the predetermined color palette based on a distance between the each possible RGB color value and the respective color in the predetermined color palette;
  storing respective color labels in a linear index array that is indexed based on the each possible RGB color value; and
  using the linear index array to map the each pixel in the second updated image to the respective mapped color.

8. The system of claim 1, wherein mapping the each pixel in the second updated image further comprises:
  verifying that the respective mapped color matches a color in a set of predetermined colors for a hue slice in an HSV space.

9. The system of claim 1, wherein mapping the each pixel in the second updated image further comprises:
  verifying that the respective mapped color matches a color in a respective set of predetermined colors in one of a black-grey-white region or a color region of a hue slice in an HSV space.

10. The system of claim 1, wherein computing instructions are further configured to perform:
  updating a color attribute value for the item in an item catalog based on the one or more dominant colors.

11. A method being implemented via execution of computing instructions configured to run at one or more processors and stored at one or more non-transitory computer-readable media, the method comprising:
  obtaining an image of an item;
  removing background pixels from the image by removing white pixels from the image based on a first criteria that depends on a first threshold;
  determining an item outline of the item in the image, wherein the item outline comprises aliased pixels along a periphery of the item in the image;
  removing grey pixels from the item outline in the image based on a second criteria that depends on a second threshold and a third threshold to create a first updated image, wherein the second threshold is greater than the first threshold;
  removing shadows from the first updated image to create a second updated image based on a saliency map and a third criteria for shadow-like grey pixels;
  mapping each pixel in the second updated image to a respective mapped color in a predetermined color palette; and
  determining one or more dominant colors of the respective mapped colors based on one or more highest respective percentages of the respective mapped colors.

12. The method of claim 11, wherein the first criteria comprises:

$|r-1|+|g-1|+|b-1|<0.05$, where r represents a scaled red value of an RGB color value of a respective pixel; g represents a scaled green value of the RGB color value of the respective pixel, b represents a scaled blue value of the RGB color value of the respective pixel, and the first threshold is 0.05.

13. The method of claim 11, wherein the second criteria threshold comprises:

$|r-1|+|g-1|+|b-1|<0.1$ and $m-s<10$, where r represents a scaled red value of an RGB color value of a respective pixel; g represents a scaled green value of the RGB color value of the respective pixel, b represents a scaled blue value of the RGB color value of the respective pixel, m represents a middle second highest value of the R, G, and B color values of the RGB color value of the respective pixel on a [0, 255] scale, s represents a minimum of the R, G, and B color values of the RGB color value of the respective pixel, the second threshold is 0.1, and the third threshold is 10.

14. The method of claim 11, wherein determining the item outline of the item in the image further comprises:
  generating an outer outline mask and an inner outline mask of the item in the image;
  generating an item outline mask by subtracting the inner outline mask from the outer outline mask; and
  determining the item outline based on the item outline mask.

15. The method of claim 11, wherein the third criteria threshold for shadow-like grey pixels comprises:
  a saturation level below a predetermined saturation level on a color saturation scale; and
  a light value below a predetermined light value.

16. The method of claim 11, wherein the third criteria threshold for shadow-like grey pixels comprises:

$(R-G)<2$ and $(G-B)<2$ and $(R-B)<2$, where R represents a red value of an RGB color value of a respective pixel; G represents a green value of the RGB color value of the respective pixel, and B represents a blue value of the RGB color value of the respective pixel.

17. The method of claim 11, wherein mapping the each pixel in the second updated image to the respective mapped color in the predetermined color palette further comprises:
  precomputing a mapping from each possible RGB color value to a respective color in the predetermined color palette based on a distance between the each possible RGB color value and the respective color in the predetermined color palette;
  storing respective color labels in a linear index array that is indexed based on the each possible RGB color value; and
  using the linear index array to map the each pixel in the second updated image to the respective mapped color.

18. The method of claim 11, wherein mapping the each pixel in the second updated image further comprises:
  verifying that the respective mapped color matches a color in a set of predetermined colors for a hue slice in an HSV space.

19. The method of claim 11, wherein mapping the each pixel in the second updated image further comprises:
  verifying that the respective mapped color matches a color in a respective set of predetermined colors in one of a black-grey-white region or a color region of a hue slice in an HSV space.

20. The method of claim 11, further comprising:
  updating a color attribute value for the item in an item catalog based on the one or more dominant colors.

* * * * *